March 28, 1933.  J. H. PINSON  1,902,891
CHECK ROW PLANTER
Filed Jan. 14, 1931  2 Sheets-Sheet 1
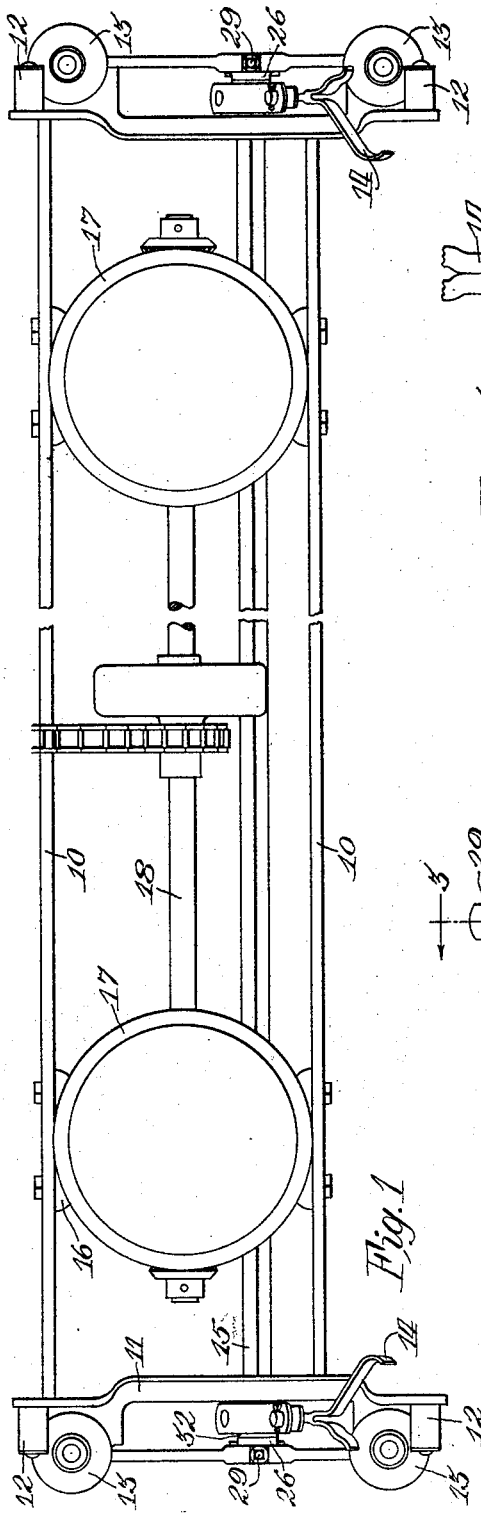
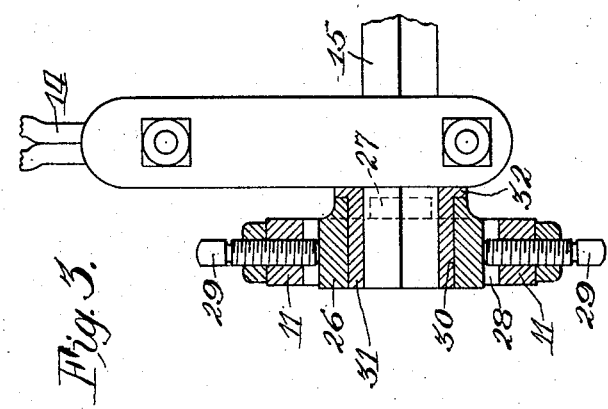
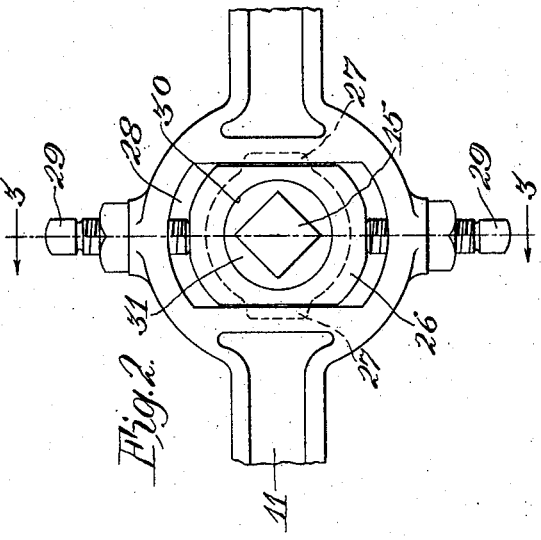
Inventor
James H. Pinson March 28, 1933.  J. H. PINSON  1,902,891
CHECK ROW PLANTER
Filed Jan. 14, 1931   2 Sheets-Sheet 2
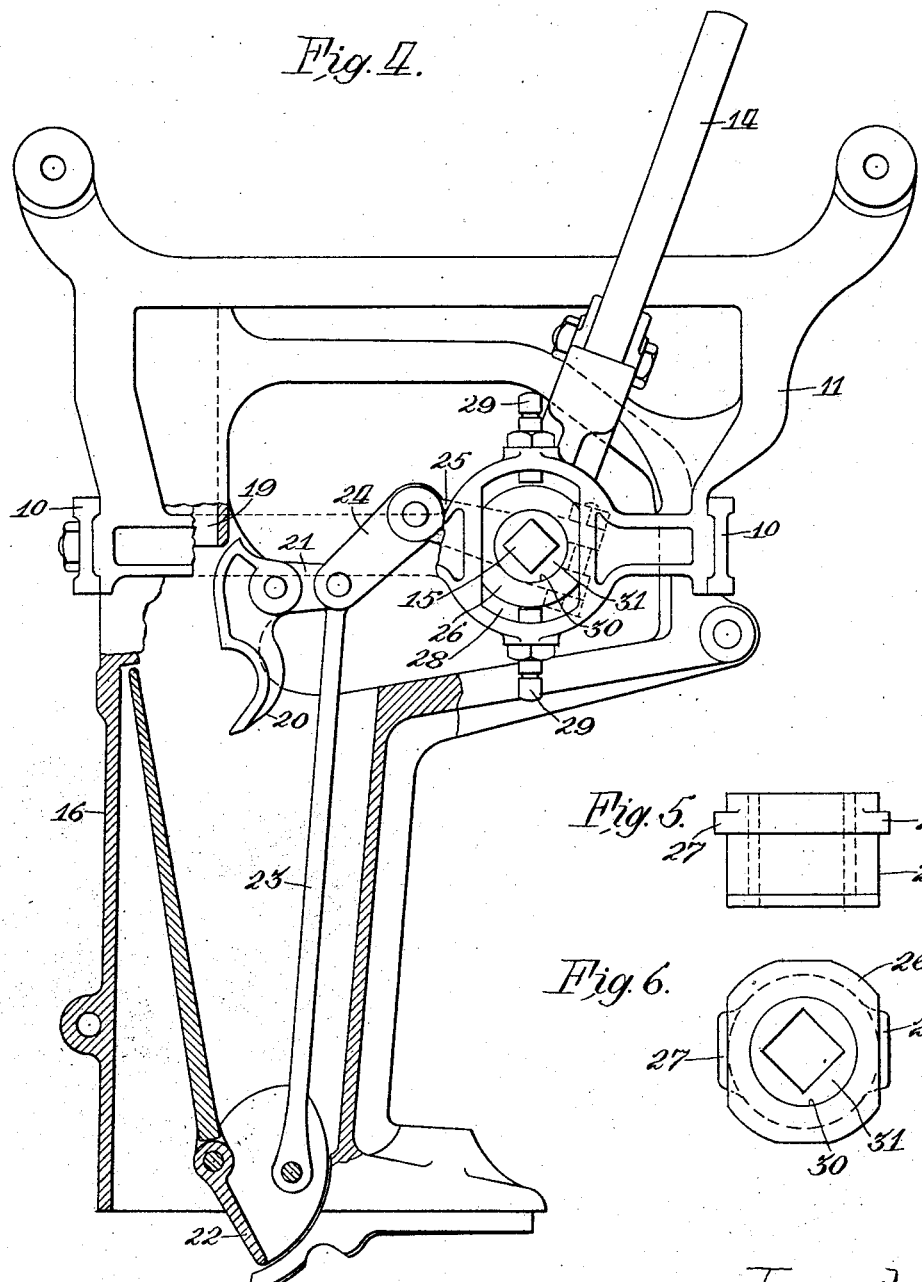
Inventor
James H. Pinson Patented Mar. 28, 1933

1,902,891

UNITED STATES PATENT OFFICE

JAMES H. PINSON, OF RICHMOND, INDIANA, ASSIGNOR TO INTERNATIONAL HARVESTER COMPANY, A CORPORATION OF NEW JERSEY

CHECK ROW PLANTER

Application filed January 14, 1931. Serial No. 508,735.

This invention relates to a check row planter. More particularly, it relates to the manner of mounting the check row shaft on such a planter.

In the use of check row planters it is essential that seed discharging valves, which are operated by a check shaft extending transversely across the planter be actuated at exactly the same time. In manufacturing the parts utilized in building up planters it has been found that slight inaccuracies in the various elements often result in a slight error in the timing of the discharge valves. It has also been found that during the use of the planter the normal wear of the parts also cause the same inaccuracy in the timing.

The object of the present invention is to provide a construction in which adjustment may be made to correct the errors brought about by manufacturing inaccuracies and to provide for correcting the misadjustment brought about by normal wear on the planter parts.

Another object is to provide a removable bearing for the check shaft, which may be readily replaced when it becomes worn sufficiently to affect the proper operation of the planter.

These and other objects, which will be apparent from the detailed description to follow, are accomplished by the construction and arrangement of the parts as shown in the drawings, in which:

Figure 1 is a plan view of such portions of a planter as are necessary to illustrate the invention;

Figure 2 is an enlarged detail view of the adjustable bearing which constitutes an essential element of the invention;

Figure 3 is a section taken on the line 3—3 of Figure 2;

Figure 4 is an end view of the construction shown in Figure 1, part of which is shown in section to illustrate the discharge valve action; and Figures 5 and 6 are enlarged details of the removable and adjustable bearing.

The construction which constitutes this invention may be utilized in any conventional check row planter such as that illustrated in the drawings. Only a portion of the planter frame is shown.

The parallel bars 10 constitute a portion of the planter frame. A check row head 11 of a conventional frame is mounted at each end on the bars 10. The check row head contains the usual wire guiding means 12 and 13 for holding the check wire in operative relation with respect to the check fork 14, which is mounted on the rock shaft 15. Boots 16 extending downwardly below the planter frame, are adapted to be attached above the runner in the usual manner. Seed hoppers 17 are suitably mounted on the planter frame to provide a seed supply for the dispensing mechanisms operated there beneath and driven by the shaft 18. The seed is discharged through a delivery chute 19 on to a retaining member 20. The member 20 is pivotally mounted with respect to the boot and is provided with a lever extension 21, by which it is operated. At the bottom of the boot a discharge valve 22 is pivotally mounted and extends across the bottom of the boot in such a manner as to be operative to close or open said boot for the discharge of seed therefrom. An actuating link 23 is pivotally connected to the valve 22 and to a link 24. The lever extension 21 is also pivoted to the members 23 and 24 on the same axis. The link 24 is pivotally connected to a lever arm 25, which is rigidly mounted on the rock shaft 15. At each end of the rock shaft 15 adjustable bearings 26 are provided. As shown in Figures 5 and 6, these bearings comprise an annular portion through which the shaft 15 extends and laterally extending flanges 27. The flanges 27 extend from flattened side portions of the bearings. The surfaces from which the flanges extend are parallel to provide for vertical movement in the slots 28 formed in the check heads. Set screws 29, positioned in the check head centrally of the slots 28 above and below the bearings 26 mounted therein, hold the bearings securely in position. The flanges 27 abut the inner side of the portion of the check head in which the slot is formed. Transversely extending openings 30 are formed in the bearing 26, considerably larger than the check shaft 15 which passes therethrough. Bearing sleeves 31 having square holes therethrough corresponding in size and shape with the cross section of the check shaft, are fitted thereon and are rotatably mounted in the openings 30 in the bearings. Flanges 32 formed on the outer ends of the sleeves 31 abut the outer ends of the bearings and the check forks 14 whereby longitudinal movement of the check shaft and the sleeves is prevented.

When a planter is first assembled in which this invention is embodied, the discharge valves 22 are timed by vertically adjusting the bearings 26. It will be understood that due to the construction of the linkage comprising the lever arm 25, the link 23, the lever extension 21 and the link 24, any vertical displacement of the axis of the check shaft 15 will alter the time of discharge of the valve 22. By position of an adjustable bearing, as described, the planter when assembled may be adjusted so that the valves 22 at each side of the planter discharge at exactly the same time.

When a planter has become worn in use, particularly in the check shaft bearings, the said bearings may be adjusted to obtain a simultaneous discharge from the valves 22. In case the bearing becomes worn to an appreciable extent, it may be easily removed and replaced by a new part.

It is to be understood that applicant has shown and described only a particular embodiment of his improved check row shaft adjustment and that he limits his invention only by the scope of the appended claims.

What is claimed is:

1. In a grain planter a frame structure, seed dispensing means mounted thereon at laterally spaced locations, seed depositing means extending downwardly from the dispensing means, each of the depositing means comprising a boot formed with a seed passage therethrough, a discharge valve controlling said seed passage, an actuating link extending upwardly from the valve, a check row rock shaft mounted transversely of the frame structure, lever arms joining each of the valve actuating links to the rock shaft, and means for vertically adjusting the ends of the rock shaft with respect to the frame structure whereby the discharge timing of the valves is altered.

2. A device as set forth in claim 1 in which the adjusting means are vertically adjustable rock shaft bearings.

3. In a check row grain planter a rock shaft adapted to be operated by a check wire, lever arms carried by said rock shaft at spaced positions thereon, seed discharging mechanisms mounted on the planter, means connecting said lever arms with said mechanisms, and means for adjustably mounting the rock shaft on the planter, whereby the time of operation of the discharging mechanisms may be altered.

4. In a check row planter seed discharging mechanisms mounted on the planter, a rock shaft extending transversely of the planter provided with means for operation by a check wire, a pair of bearing means adjustably mounted on the planter for rotatably supporting the ends of said rock shaft, lever arms carried by said rock shaft at spaced positions thereon, and means connecting said lever arms with the seed discharging mechanisms, whereby the adjustable bearing is effective for alteration of the time of operation of the discharging mechanisms.

In testimony whereof I affix my signature.

JAMES H. PINSON.